United States Patent [19]
Clarke et al.

[11] Patent Number: 5,605,209
[45] Date of Patent: Feb. 25, 1997

[54] COMPOSITE ELECTRICAL CONDUCTOR RAIL

[75] Inventors: Robin A. Clarke, Woodbridge; William R. Heil, Shelton; Robert S. Beale, Stratford, all of Conn.

[73] Assignee: Howell Corporation, Stratford, Conn.

[21] Appl. No.: 582,148

[22] Filed: Dec. 19, 1995

[51] Int. Cl.⁶ .................................................... B60M 1/34
[52] U.S. Cl. ................. 191/23 A; 191/22 DM; 191/29 DM
[58] Field of Search ............... 191/22 R, 22 DM, 191/23 R, 23 A, 24, 28, 29 R, 29 DM, 30, 33 R, 33 PM

[56] References Cited

U.S. PATENT DOCUMENTS

| | | | |
|---|---|---|---|
| 1,101,579 | 6/1914 | Steinberger | 191/33 PM |
| 2,835,752 | 5/1958 | Anjeskey et al. | 191/23 A X |
| 3,144,508 | 8/1964 | Howell, Jr. | 191/23 A X |
| 3,303,293 | 2/1967 | Howell, Jr. | 191/23 A |
| 3,303,294 | 2/1967 | Howell, Jr. | 191/64 |
| 3,399,281 | 8/1968 | Corl | 191/29 DM X |
| 3,506,099 | 4/1970 | Howell, Jr. | 191/23 |
| 3,525,823 | 8/1970 | Howell, Jr. | 191/59.1 |
| 3,649,779 | 3/1972 | Howell, Jr. | 191/45 A |
| 3,892,299 | 7/1975 | Kilburg | 191/29 DM X |
| 3,902,579 | 9/1975 | Howell, Jr. | 191/29 |
| 3,995,725 | 12/1976 | Howell, Jr. | 191/23 A |
| 3,998,306 | 12/1976 | Howell, Jr. | 191/23 |
| 4,014,417 | 3/1977 | Kugler et al. | 191/29 DM |
| 4,016,961 | 4/1977 | Howell, Jr. | 191/23 A |
| 4,106,599 | 8/1978 | Howell, Jr. | 191/27 |
| 4,155,434 | 5/1979 | Howell, Jr. | 191/22 R |
| 4,163,485 | 8/1979 | Howell, Jr. | 191/40 |
| 5,373,926 | 12/1994 | Clarke et al. | 191/23 R |

*Primary Examiner*—Karen B. Merritt
*Assistant Examiner*—Scott L. Lowe
*Attorney, Agent, or Firm*—H. Gibner Lehmann; K. Gibner Lehmann

[57] ABSTRACT

A conductor rail and method for its production. The rail is constituted as a bimetallic, non-integral, unitary laminate assemblage of two formed, nesting dissimilar metal strips, for sliding engagement by an electrical collector shoe. The assemblage has a grooved track portion for receiving the shoe, and a suspension portion adapted to be clamped by suspender fittings. One of the metal strips is fully exterior to the other strip and is preferably constituted of steel, whereas the other metal strip is preferably copper, characterized by relatively higher electrical conductivity. The arrangement is such that the nested strips are in intimate, large-surface contact with each other. The rail thus enjoys the advantage of high strength and abrasion resistance, and improved electrical performance. The rail can be utilized in new equipment, or as a replacement for worn or damaged rail sections, essentially without modification of existing hanger or insulating hardware, or existing jacketing insulations.

22 Claims, 2 Drawing Sheets

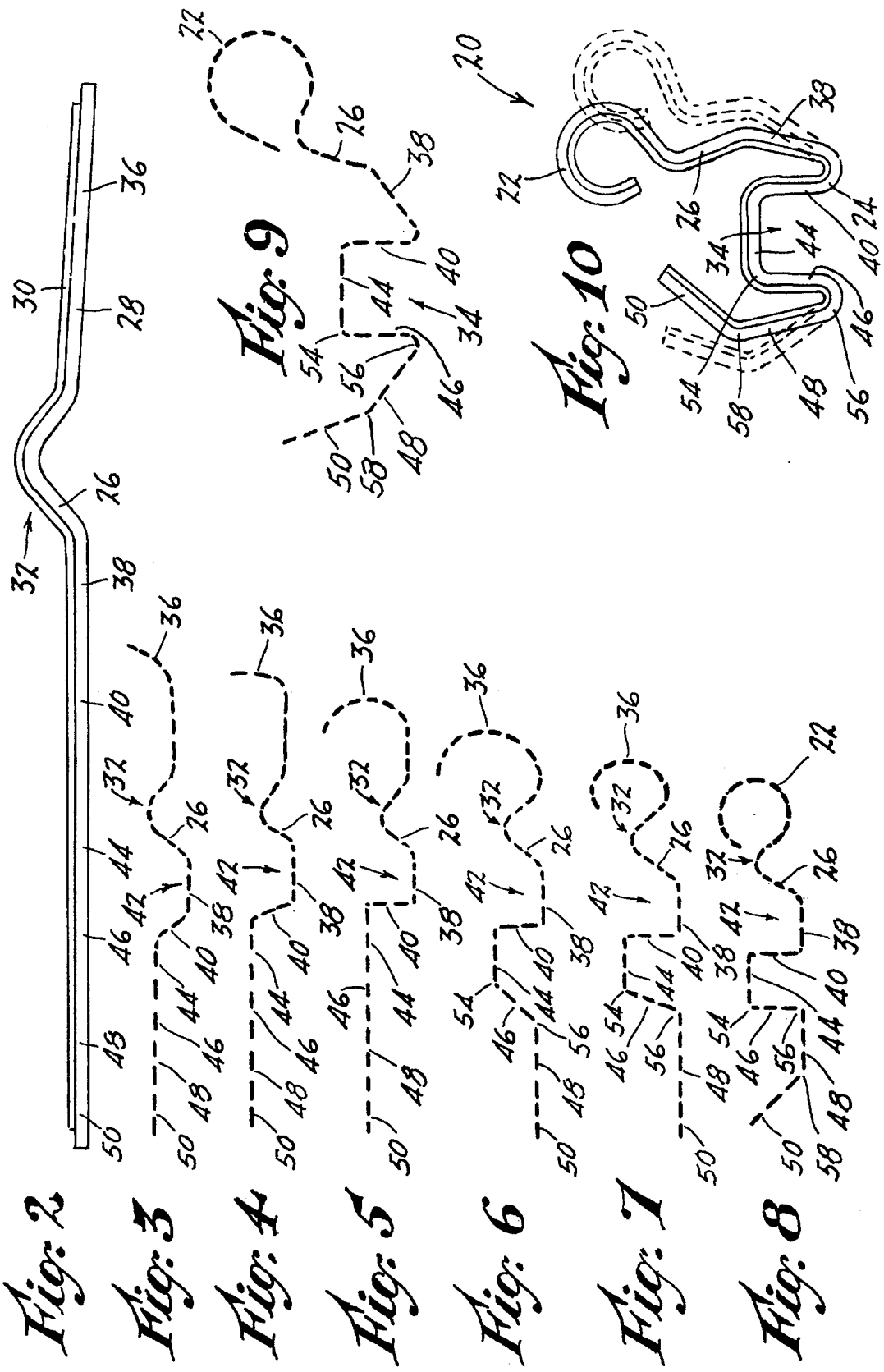

COMPOSITE ELECTRICAL CONDUCTOR RAIL

CROSS REFERENCES TO RELATED APPLICATIONS/PATENTS

U.S. Pat. No. 3,995,725, issued Dec. 7, 1976, entitled HANGER FOR CONDUCTOR RAILS, and having common ownership with the present application.

The entire disclosure of U.S. Pat. No. 3,995,725, is incorporated into the present application, by specific reference made herein.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

FIELD OF THE INVENTION

This invention relates generally to rail electrification systems, and more particularly to steel conductor rail constructions utilized in such systems.

DESCRIPTION OF THE RELATED ART INCLUDING INFORMATION DISCLOSED UNDER 37 CFR Sections 1.97–1.99

The following references are hereby cited as being of interest in the technical field of the invention:

| U.S. Pat. Nos.: | | |
|---|---|---|
| 3,303,294 | 3,506,099 | 3,525,823 |
| 3,649,779 | 3,902,579 | 3,995,725 |
| 3,998,306 | 4,016,961 | 4,106,599 |
| 4,155,434 | 4,163,485 | 5,373,926 |

U.S. Pat. Nos. 3,998,306 and 4,016,961 illustrate typical rail constructions of a type which are utilized in rail electrification systems for industrial cranes, conveyers, hoists, monorail systems, automated storage and retriever systems, and Port Authority Equipment, as well as in other applications. In particular, the disclosed patented structures involve electrically conductive rail members having track portions and hanger portions connected by adjoining web portions, and typically constituted of steel and/or aluminum. A flat contact strip of stainless steel is provided, characterized by good wear resistance and moderate electrical conductivity. Suitable mounting clamps and insulating jackets are also provided.

Modified rail constructions are shown in U.S. Pat. Nos. '599; '485; '725; '823; '779; '099; and '294. U.S. Pat. No. '579 illustrates a rail assembly of a type incorporating a plastic or glass insulating hanger.

U.S. Pat. No. 4,155,434 illustrates a 3-phase rail electrification system employing an insulating support for mounting a plurality of rails.

U.S. Pat. No. 5,373,926 relates to an improved insulating jacket for a conductor rail, featuring increased protection against inadvertent electrical shock to personnel occupying the areas in which the rails are located; the disclosed construction has enjoyed considerable commercial success.

As with most products, efforts are constantly under way to incorporate improvements, by either reducing the manufacturing cost so as to render the product more competitive, or making the product safer, more reliable, less wasteful of energy, and the like.

In the case of rail electrification systems, while steel-composition rails have met with widespread acceptance and use, it is considered that steel is at best, marginal in its electrical conductivity, typically being only fractionally as good as copper.

Where current carrying capacity is of little importance, such a disparity may not amount to much. However, in many rail electrification systems the electrical currents are typically on the order of hundreds of amperes. Under such circumstances, losses resulting from voltage drops, as well as resistance heating of the conductive parts, becomes a consideration to be dealt with.

SUMMARY OF THE INVENTION

The above disadvantages and drawbacks of prior, all-steel rail constructions are largely obviated by the present invention, which has for one object to provide a novel and improved rail construction which is simple in its structure, and which features significantly improved electrical conductivity, thereby reducing losses due to excessive voltage drops.

A related object is to provide an improved rail construction as above set forth, which is mechanically strong, and wherein the portion which provides the improved electrical conductivity is largely confined by the physically stronger of the materials, to provide a rugged rail component which is resistant to inadvertent damage from handling, installation and/or use.

Still another object of the invention is to provide an improved rail construction of the kind indicated, which is similar in exterior configuration to conventional rail structures, and which therefore can be substituted in existing installations, as a retro-fit, to provide improved operating efficiency.

Yet another object of the invention is to provide an improved rail construction as above characterized, which lends itself to fabrication on existing, automated cold-rolling equipment, thereby to maintain the manufacturing cost as low and competitive as possible.

A still further object of the invention is to provide an improved method of manufacturing a bimetallic, composite, non-integral electrical conductor rail in accordance with the foregoing, which can be readily carried out and which provides a rugged and reliable rail that can be put into service and successfully maintained in operation over extended periods of use.

Yet another object of the invention is to provide an improved rail construction as outlined above, which can be utilized with existing insulating jacket sizes, and suspended from conventional hangers, thereby eliminating the need for new or non-standard parts to be specially fabricated for use with the rail.

The above objects are accomplished by the provision of an electrical conductor rail for sliding engagement with a collector shoe, comprising in combination a bimetallic non-integral laminate assemblage constituted of two nested, essentially tubular metal strips each of irregular substantially identical cross-sectional configuration, the assemblage having a grooved track portion for receiving and guiding a collector shoe, and having a suspension portion adapted to be clamped by suspender fittings. The track portion is connected with the suspension portion by a composite double-thickness web which is coextensive with the track and suspension portions. One of the metal strips is completely and fully exterior to the other strip and comprises abrasion-resistant material, and the other of the metal strips is characterized by high electrical conductivity and high heat conductivity. The nested strips are in intimate, large-surface heat-exchanging contact with each other.

The objects are further accomplished by a novel and improved method of forming a bimetallic electrical conductor rail from two individual elongate metal strips, which includes the steps of superposing the strips lengthwise one upon the other, forming a rib lengthwise along the superposed strips at a location spaced inwardly of one pair of superposed side edges of the strips, thereafter forming an elongate curl in the strips at one lateral edge portion thereof, and forming a trough with sloping walls alongside and coextensive with the rib. The method further comprises the steps of forming reverse, spaced-apart bends in the strips in portions thereof which are adjacent to the trough, making a final longitudinally-extending bend spaced inwardly of the other pair of superposed side edges of the strips, and folding inward toward each other the side edge portions of the strips which contain the final longitudinal bend and curl, thereby to form a suspension bead disposed above a track and connected thereto by an oblique web.

In a preferred form the outer strip is constituted of steel, galvanized steel, or stainless steel, and the inner strip is of copper. The latter provides significantly improved electrical conductivity and reduced resistance heating, thereby minimizing undesirable voltage drops and attendant power losses. The outer strip, being steel, retains the high abrasion resistance of conventional all-steel rails, while the inner, copper core strip is protected against inadvertent damage as might occur during installation, repair, and use of the rail. A substantially improved rail component is thus realizeable, at a competitive cost. Also, the improved rail is useable with existing rail hardware, insulating jackets, joints, etc., as typically encountered in older rail installations, and without requiring any adaptive modifications of any kind, to such installations.

Other features and advantages will hereinafter appear.

BRIEF DESCRIPTION OF THE DRAWINGS

In the drawings, illustrating a preferred embodiment of the invention:

FIG. 2 is an enlarged end view of a pair of superposed metal strips used to form the conductor rail of FIG. 1, after the strips have been superposed one upon the other in flat form and thereafter passed through the first stage of a cold-rolling machine, during which the strips are formed with an elongate rib structure between their superposed lateral edge portions.

FIG. 3 is a diagrammatic broken-line representation of a subsequent forming step involving the strips of FIG. 2, particularly illustrating the formation of an elongate curl in the strips at one lateral edge portion thereof, and the formation of a trough having sloping walls, disposed alongside and coextensive with the previously-formed rib.

FIGS. 4 and 5 are views similar to FIG. 3, but showing later successive steps involving straightening of one wall of the trough and simultaneously rendering the curl more pronounced.

FIG. 6 is a view like FIGS. 3–5, but showing the formation of reverse, spaced-apart bends in the strips, located in portions thereof which are remote from the curl, and showing the curl in a more advanced shape.

FIG. 7 is a view like FIGS. 3–6, but showing the first step of making the reverse bends and the curl yet more pronounced.

FIG. 8 is a view like FIGS. 3–7, but showing the reverse bends as having been squared, and the curl as having been rendered still more pronounced. Additionally, this figure illustrates the formation of a longitudinally-extending bend spaced inwardly of the other pair of superposed side edges of the strips.

FIG. 9 is a view like FIGS. 3–8, but showing the step of partially folding inward toward each other, the side edge portions of the strips which contain the preceding longitudinal bend and curl, and FIG. 10 is a diagrammatic end elevation of the rail prior to the final configuration of FIG. 1, this figure illustrating in dotted outline the curl as having been made still further pronounced to form a bead while both side edge portions of the strips are folded further inward. FIG. 10 additionally shows in solid outline, the step of folding still further inward the side edge portions of the strips to locate the suspension bead above the track of the rail and connected thereto by an oblique web.

DESCRIPTION OF THE PREFERRED EMBODIMENT

Figure 1:
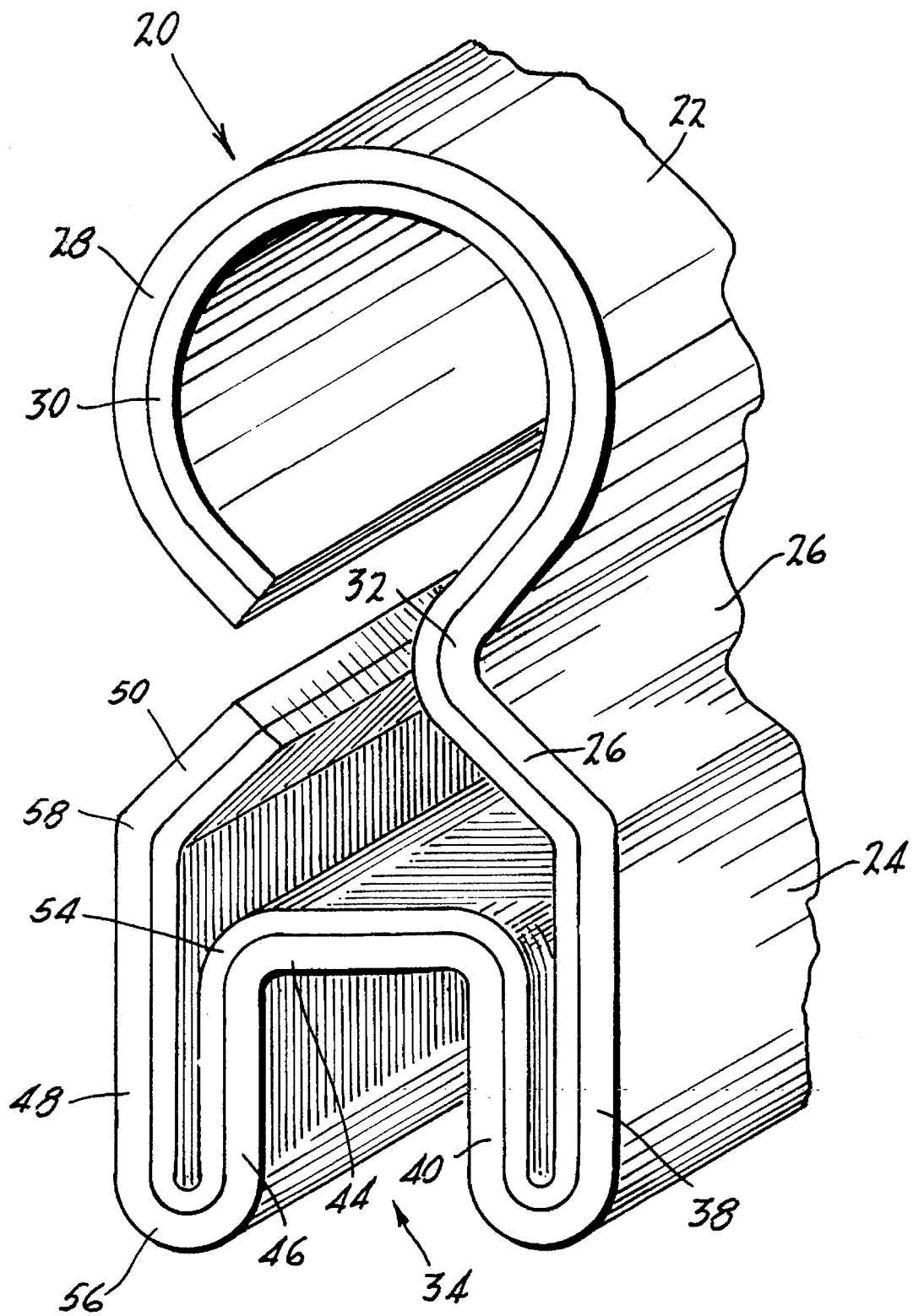
FIG. 1 is a fragmentary perspective view, greatly enlarged, of the end portion of the improved conductor rail of the present invention, illustrating an assemblage of slide contactor track, suspension bead, and connecting web therebetween.

Referring first to FIG. 1 there is illustrated an electrical conductor rail for use with rail electrification systems of a type shown, for example, in U.S. Pat. No. 3,995,725, utilizing spring-biased collector shoes which slidably engage and electrically contact a track portion of the rail. The rail is generally designated by the numeral 20 comprising a suspension portion or bead 22 which is adapted to be engaged by suitable hangers in the manner of the above patented rail construction, a slide contactor track or track portion 24 which is slidably engaged by the collector shoe in the manner of the patented rail construction, and a connector or oblique web portion 26 which joins the suspension and track portions to each other.

In accordance with the present invention the improved rail 20 is constituted as a cold-rolled, laminated assemblage of two initially, substantially flat strips of dissimilar metal; following a series of forming steps to be described below, the strips become tubular, and each has a profile or cross-sectional configuration which is substantially identical to that of the other, but with the inner strip being slightly smaller physically and telescopically tightly nested the outer strip. The arrangement is such that the strips are in mechanical and electrical contact with one another substantially completely along their respective axial lengths. The resulting rail, though unitary, is non-integral in that it is constituted of two separate metals or parts, and in that the parts are formed into telescoping relation by the cold-rolling assembly steps of the invention as described in detail below.

In a preferred embodiment, and according the invention, the rail assemblage has an outer member 28 constituted of either steel, galvanized steel or stainless steel, and an inner member 30 which is copper. With such construction, the steel member 28 provides rigidity and strength to the rail assembly, as well as providing abrasion resistance at the surfaces of the track portion which are slidably engaged by the collector shoe (not shown), whereas the copper member 30 provides a high electrical and heat conductivity. With each member being in close physical contact with the other the temperatures of the members tend to equate.

In practice, a plurality of standard lengths of rail sections are joined together to form a multi-section rail system (not shown) of the desired length, as can be readily understood.

In carrying out the fabrication of the rail in accordance with the principles of the invention, an elongate strip of copper is superposed onto a strip of steel, both metals being dereeled from separate coils (not shown) of strip stock. The superposed strips are fed to a cold-rolling machine manufactured by Yoder Company, specifically a Yoder 11 Stand Roll Former; or a B & K Roll Former. In such cold-rolling machines, the superposed strips are fed to a plurality of bending/forming stations (not shown) which have pressure rollers located and spaced so as to impart a series of predetermined bends in the strips and with the pressure needed to form the strips and maintain them in superposed relation as they travel through the various stations.

In the drawings the various stages in the cold-roll formation of the rail 20 are diagrammatically illustrated, specifically in FIGS. 2–10 respectively. In FIG. 2, showing the end view of the superposed strips 28 and 30, an inwardly located rib 32 has been formed, extending lengthwise along the strips at a predetermined location spaced somewhat inwardly of the rightmost pair of superposed side edges of the strips. The initial step is performed at a beginning one of the stations of the cold-rolling machine. As the strips are fed to a subsequent station in the machine, additional bends are imparted to the strips as indicated in FIGS. 3–10, to generally form in the strips the bead 22, the web 26, and the track 24. As shown in FIG. 1, the track of the completed rail assembly includes a groove 34 of U-shaped cross-section, to receive the collector shoe.

In FIGS. 1–10 numerous consecutive reference characters have been applied to various surfaces and portions of the rail strips, to clearly identify the different relationships, as follows: The character 36 indicates the curl portion or curl. As the curl progresses, it becomes the bead 22. The web portion has already been designated as 26. One outside surface of the track is designated 38, and one inside surface of the track is 40. A trough 42 is formed by the strip portions 26, 38 and 40. The bottom surface portion of the groove 34, constituting a slide contactor portion of the track 24, is designated 44. The remaining inner side wall of the track groove 34 is indicated by 46, and the other outside surface of the track is labelled 48. The closure portion of the configuration is designated 50.

Returning again to FIG. 3 and continuing with the progressive steps, there is next formed the beginning of the curl 36 in the strips at one lateral edge portion thereof, and simultaneously therewith there is formed the trough 42 with sloping walls alongside of and coextensive with the rib 32. FIGS. 4 and 5 show successive additional steps, involving straightening of one wall of the trough 42 and simultaneously rendering the curl 36 still more pronounced. FIG. 6 illustrates the formation of reverse, spaced-apart bends 54, 56 in the strips in portions thereof which are remote from the curl 36, while simultaneously rendering the curl 36 still further pronounced, whereas FIG. 7 shows the step of sharpening the reverse bends 54, 56 and enhancing the curl 36 toward the later bead profile 22, which is annular or circular.

In FIG. 8, the reverse bends 54, 56 are squared, the curl 36 is further enhanced, and there is formed a longitudinally-extending bend 58 spaced inwardly of the other pair of superposed side edges of the strips.

Continuing to FIG. 9, there is illustrated the step of partially folding inward toward each other, the side edge portions of the strips which contain the final longitudinal bend 58 and further enhanced curl now in the shape of the bead 22. In dotted outline in FIG. 10, the configuration of the bead 22 is finalized, while the side edge portions of the strips are folded still further inward. In solid outline in FIG. 10, there is illustrated the step of folding yet further inward the side edge portions of the strips so as to position the suspension bead 22 above the track 24, with the bead 22 and track 24 being connected by the oblique web 26, which was partially formed in FIG. 2 as the elongate rib 32.

From the position of FIG. 10, in arriving at the completed rail assembly as illustrated in FIG. 1, additional folding of the side edge portions of the strips is effected. As shown in FIG. 10, the surfaces or portions 38, 40 of the track form an upwardly facing U-shaped channel, with the surfaces or portions 46, 48 similarly forming an upwardly facing U-shaped channel which is coextensive with the first, both channels being symmetrically disposed with respect to the groove 34. In addition, each channel defines a narrow groove, and the narrow grooves in turn face the circular curl or bead 22 of the rail. The track portion 24 on the other hand, faces laterally in a direction away from the curl of the rail.

The completed rail thus constitutes a composite construction, consisting essentially of two different metallic strips in nesting relation and of substantially identical cross-sectional configuration, with the outer strip in FIG. 1 being constituted of steel, galvanized steel, or stainless steel, and the inner strip being preferably constituted of copper. The nested strips are thus seen to be in intimate, large-surface heat-exchanging contact with each other. In addition, the outer portions of both the rail bead and the rail track are thus part of the original steel strip, and the surfaces thereof are thus integral continuations of one another. They are highly resistant to abrasion from rubbing of the shoe, or from handling or installation.

The copper layer, being softer, will have a tendency to cold flow during the rolling process. To compensate for this the copper strip can be made slightly less wide as shown in FIG. 2, so as to bring out the side edges essentially flush with each other in the completed rail, as shown in FIG. 1.

The thicknesses of the steel and copper strips can typically be 0.030" and 0.020", respectively, in a preferred embodiment. Multiple rail sections thus fabricated can be placed end-to-end respectively, and mechanically and electrically joined to form extended lengths of a rail assembly, by conventional means involving alignment structures which are, per se, known in the art. In addition, conventional hangers and insulating jackets are capable of utilization with the rail of the invention, since in many cases the exterior dimensions of the outer member substantially duplicate those of a conventional, single layer steel rail.

The improved electrical-conductivity of the copper core has the desired effect of a reduction in loss due to voltage drops along the rail, which is especially significant where the rails carry large electrical currents as are typically encountered in trolley or subway systems, or with tracks that are utilized in single- or three-phase power systems for industrial hoists in warehouses and the like.

The present rail can be readily mass produced from coiled strip stock, and can be cut to desired lengths by suitable flying cutters (not shown) which are, per se, known in the art.

The composite, cold-rolled bimetallic rail of the present invention is thus seen to represent a distinct advance and improvement in the field of rail electrification systems.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. An electrical conductor rail for sliding engagement by a collector shoe, comprising in combination:
   a) a bimetallic non-integral laminate assemblage constituted of two nested essentially tubular metal strips each of irregular substantially identical cross-sectional configuration,
   b) said assemblage having a grooved track portion for receiving and guiding a collector shoe, and having a suspension portion adapted to be clamped by suspender fittings,
   c) said track portion being connected with said suspension portion by a web which is coextensive with said track and suspension portions,
   d) one of said metal strips being completely and fully exterior to the other strip and comprising abrasion-resistant material,
   e) the other of said metal strips being characterized by high electrical conductivity and high heat conductivity, and
   f) said nested strips being in intimate, large-surface heat-exchanging contact with each other.

2. An electrical conductor rail as set forth in claim 1, wherein:
   a) the thickness of the said other of the metal strips is a large fraction of the thickness of the said one metal strip.

3. An electrical conductor rail as set forth in claim 1, wherein:
   a) the said track portion is disposed below the suspension portion, and
   b) the groove in the track portion faces downward and has a flat, highly abrasion-resistant contact surface for engagement by collector shoes.

4. An electrical conductor rail as set forth in claim 3, wherein:
   a) the groove in the track portion has side walls which are characterized by high abrasion resistance.

5. An electrical conductor rail as set forth in claim 1, wherein said one metal strip comprises stainless steel.

6. An electrical conductor rail as set forth in claim 5, wherein said other metal strip comprises copper.

7. An electrical conductor rail as set forth in claim 1, wherein:
   a) the suspension portion of the conductor rail has an essentially annular cross section.

8. An electrical conductor rail as set forth in claim 7, wherein:
   a) the cross section of the suspension portion of the conductor rail is essentially circular.

9. An electrical conductor rail as set forth in claim 8, wherein:
   a) the cross section of the track portion of the conductor rail is essentially U-shaped.

10. A method of forming a non-integral, bimetallic conductor rail from two individual elongate metal strips, comprising the steps of:
    a) superposing the strips lengthwise one upon the other,
    b) forming a rib lengthwise along the superposed strips and at a central position thereon measured laterally of the strips,
    c) forming an elongate curl in the strips at one lateral edge portion thereof, and
    d) forming a pair of elongate, coextensive substantially U-shaped channels in the strips in a lateral position thereon disposed between the said rib and the opposite lateral edge portion of the superposed strips.

11. The method of forming a conductor rail as set forth in claim 10, wherein a portion of said rib forms a web which is connected with said curl, said one lateral edge portion of the superposed strips facing the web.

12. The method of forming a conductor rail as set forth in claim 10, wherein substantial portions of said strips are disposed in close, intimate physical contact with one another.

13. The method of forming a conductor rail as set forth in claim 10, wherein substantial portions of said strips are disposed in electrical contact with one another, the metals of said strips being characterized by different electrical conductivities, respectively.

14. The method of forming a conductor rail as set forth in claim 10, wherein the coextensive U-shaped channels together define side walls of a slide contactor track and surfaces of said side walls being constituted of solely one of said metal strips.

15. The method of forming a conductor rail as set forth in claim 14, wherein said curl has a lateral cross-section of substantially circular configuration.

16. The method of forming a conductor rail as set forth in claim 15, wherein said curl and said track each have exterior surfaces, said exterior surfaces comprising integral continuations of one another and being constituted of solely one of said metal strips.

17. The method of forming a conductor rail as set forth in claim 14, wherein the coextensive U-shaped channels define grooves which face the curl of the rail.

18. The method of forming a conductor rail as set forth in claim 17, wherein said slide contactor track faces away from the curl of the rail.

19. The method of forming a conductor rail as set forth in claim 17, wherein the coextensive U-shaped channels are substantially symmetrically disposed with respect to said track.

20. A method of forming a non-integral, bimetallic conductor rail from two individual elongate metal strips, comprising the steps of:
    a) superposing the strips lengthwise one upon the other,
    b) forming a rib lengthwise along the superposed strips and at a central position thereon measured laterally of the strips, those portions of the strips at the said rib remaining essentially in superposed relation with one another,
    c) forming an elongate curl in the strips at one lateral edge portion thereof and substantially parallel to said rib, those portions of the strips at the location of the curl remaining essentially in superposed relation with one another, and d) forming a pair of elongate, coextensive substantially U-shaped channels in the strips, said channels being substantially parallel to the said rib and disposed in a lateral position which is offset from the rib and on the opposite side thereof with respect to the location of said curl, those portions of the strips at the location of the U-shaped channels remaining essentially in superposed relation with one another.

21. A method of forming a bimetallic electrical conductor rail from two individual elongate metal strips, which includes the steps of:

a) superposing the strips lengthwise one upon the other, b) forming a rib lengthwise along the superposed strips at a location spaced inwardly of one pair of superposed side edges of the strips, c) forming an elongate curl in the strips at one lateral edge portion thereof, d) forming a trough with sloping walls alongside and coextensive with said rib and simultaneously making the curl more pronounced, e) straightening one wall of said trough and simultaneously making the curl still more pronounced, f) forming reverse, spaced-apart bends in the strips in portions thereof which are remote from the curl and simultaneously making the curl still further pronounced, g) making the reverse bends and the curl yet more pronounced, h) squaring the reverse bends, making the curl still more pronounced and simultaneously making a final longitudinally-extending bend spaced inwardly of the other pair of superposed side edges of the strips, i) partially folding inward toward each other the side edge portions of the strips which contain the said final longitudinal bend and curl, j) making the curl further pronounced to form a bead while folding further inward the side edge portions of the strips, and k) completing the folding inward of the side edge portions of the strips to form a suspension bead disposed above a track and connected thereto by an oblique web.

22. A method of forming a bimetallic electrical conductor rail from two individual elongate metal strips, which includes the steps of:

a) superposing the strips lengthwise one upon the other, b) forming a rib lengthwise along the superposed strips at a location spaced inwardly of one pair of superposed side edges of the strips, c) forming an elongate curl in the strips at one lateral edge portion thereof, d) forming a trough with sloping walls alongside and coextensive with said rib and simultaneously making the curl more pronounced, e) forming reverse, spaced-apart bends in the strips in portions thereof which are adjacent said trough, f) making a final longitudinally-extending bend spaced inwardly of the other pair of superposed side edges of the strips, and g) folding inward toward each other the side edge portions of the strips which contain the said final longitudinal bend and curl, thereby to form a suspension bead disposed above a track and connected thereto by an oblique web.

* * * * *